United States Patent
Koch

(10) Patent No.: US 7,877,326 B2
(45) Date of Patent: Jan. 25, 2011

(54) METHODS, SYSTEMS, AND PRODUCTS FOR COLLABORATIVE AUTHORIZATIONS IN ELECTRONIC COMMERCE

(75) Inventor: Robert A. Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1051 days.

(21) Appl. No.: 11/106,874

(22) Filed: Apr. 16, 2005

(65) Prior Publication Data

US 2006/0235789 A1 Oct. 19, 2006

(51) Int. Cl.
*G06Q 40/00* (2006.01)
(52) U.S. Cl. ....................................................... 705/44
(58) Field of Classification Search .................. 705/35, 705/38–44, 64–69, 76–78, 300; 726/1–7, 726/16–19; 235/382, 382.5
See application file for complete search history.

(56) References Cited

U.S. PATENT DOCUMENTS

| | | | | |
|---|---|---|---|---|
| 6,045,039 | A * | 4/2000 | Stinson et al. | 235/379 |
| 6,047,270 | A * | 4/2000 | Joao et al. | 705/44 |
| 6,067,529 | A | 5/2000 | Ray | |
| 6,250,557 | B1 | 6/2001 | Forslund | |
| 6,487,540 | B1 | 11/2002 | Smith | |
| 6,595,342 | B1 | 7/2003 | Maritzen | |
| 7,403,922 | B1 * | 7/2008 | Lewis et al. | 705/38 |
| 7,657,482 | B1 * | 2/2010 | Shirey et al. | 705/38 |
| 2002/0073025 | A1 | 6/2002 | Tanner et al. | |
| 2002/0123938 | A1 * | 9/2002 | Yu et al. | 705/26 |
| 2002/0133424 | A1 | 9/2002 | Joao | |
| 2002/0194119 | A1 * | 12/2002 | Wright et al. | 705/38 |
| 2003/0055733 | A1 | 3/2003 | Marshall | |
| 2003/0061158 | A1 * | 3/2003 | Guy et al. | 705/39 |
| 2003/0200108 | A1 | 10/2003 | Malnoe | |
| 2003/0208684 | A1 * | 11/2003 | Camacho et al. | 713/186 |
| 2003/0217005 | A1 | 11/2003 | Drummond | |
| 2004/0029569 | A1 | 2/2004 | Khan | |
| 2004/0098740 | A1 | 5/2004 | Maritzen | |
| 2004/0225613 | A1 | 11/2004 | Narayanaswami | |
| 2005/0177750 | A1 * | 8/2005 | Gasparini et al. | 713/201 |
| 2008/0086564 | A1 * | 4/2008 | Putman et al. | 709/227 |

OTHER PUBLICATIONS

"Lightbridge's Authorize. Net Launches Fraud Detection Suite for Online IP-Based Payment Transactions", Business Wire, Apr. 20, 2004.*

* cited by examiner

*Primary Examiner*—Mary Cheung
(74) *Attorney, Agent, or Firm*—Scott P. Zimmerman PLLC

(57) ABSTRACT

Methods, systems, devices, and products obtain collaborative authorization in an electronic commerce transaction. One such device includes a commerce profile stored in memory, and a processor communicates with the memory. The commerce profile stores rules for obtaining authorization for the electronic transaction. The processor accesses the commerce profile and, based on the rules, determines whether authorization from a first party is permitted or whether collaborative authorization by a second party is required to authorize the electronic transaction. When collaborative authorization is required, the processor retrieves a collaborative communications address from the commerce profile and communicates the collaborative communications address from the device.

20 Claims, 13 Drawing Sheets

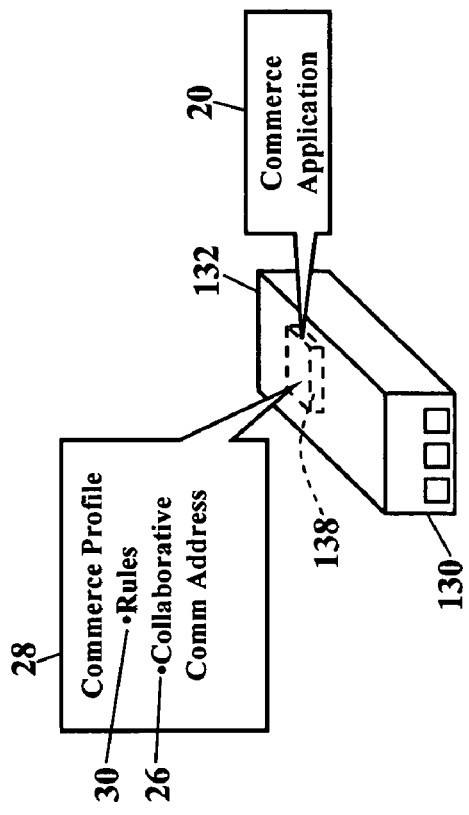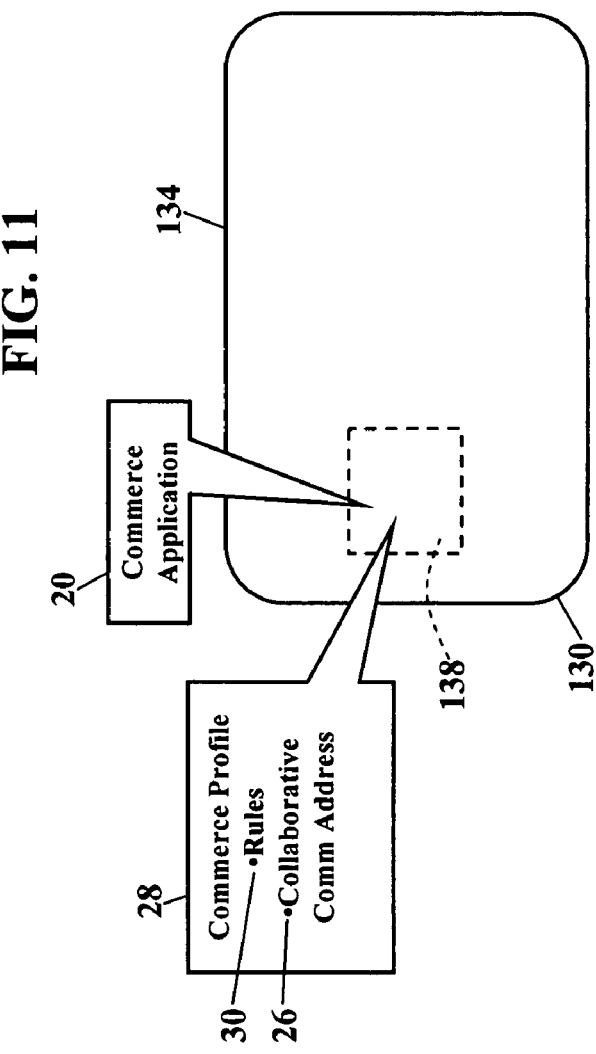

METHODS, SYSTEMS, AND PRODUCTS FOR COLLABORATIVE AUTHORIZATIONS IN ELECTRONIC COMMERCE

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to electrical communications and to data processing and, more particularly, to authorizing electronic commerce transactions.

Household debt is a problem. The New York Times recently reported that in 1990 the average, revolving credit card balance was about $2,550. By late 2004, however, the average balance had grown nearly 200% to $7,520. The average household, in addition, has even more debt for a home mortgage, student loans, and automobile loans. The Bureau of Labor Statistics also reported that in 1999 households began, on average, deficit spending. That is, throughout the 1960's, '70s, '80s, and '90s, households had an income surplus. In 1999, however, households in the United States began spending more than their yearly income. Some people forecast that we are facing a debt crisis, where increasing interest rates will cause financial ruin for many debt households.

Few mechanisms, however, are available to curb spending. Debt consolidation may help manage debt, but the total amount of debt remains unchanged. Bankruptcy is often considered a last resort and has severe consequences. Disciplined spending will successfully reduce debt, but frugality is harder to implement in a household. When debt reduction requires the efforts of multiple people in the household, the chances of successfully reducing that debt are reduced. What is needed, then, are methods, systems, and products that permit one or more persons or entities to effectively control the spending of others. The controlling person or entity should have an ability to authorize, or decline, any transaction involving other persons.

SUMMARY

The aforementioned problems, and other problems, are reduced, according to the exemplary embodiments, using methods, systems, and products that obtain collaborative authorization in an electronic transaction. One such exemplary device includes a commerce profile stored in memory, and a processor communicates with the memory. The commerce profile stores rules for obtaining authorization for the electronic transaction. The processor accesses the commerce profile and, based on the rules, determines whether authorization from a first party is permitted or whether collaborative authorization by a second party is required to authorize the electronic transaction. When collaborative authorization is required, the processor retrieves a collaborative communications address from the commerce profile and communicates the collaborative communications address from the device.

In another of the embodiments, a method obtains collaborative authorization in an electronic commerce transaction. A commerce profile stores rules for obtaining authorization for the electronic commerce transaction. The rules determine when collaborative authorization from a first person is permitted. The rules also determine when authorization by a second person is required to authorize the electronic commerce transaction. When collaborative authorization is required, a collaborative communications address is retrieved from the commerce profile and communicated.

In yet another embodiment, a computer program product obtains collaborative authorization in an electronic commerce transaction. The computer program product includes a computer-readable medium and a commerce application stored on the computer-readable medium. The commerce application comprises computer code for accessing a commerce profile storing rules for obtaining authorization for the electronic commerce transaction. The rules determine when collaborative authorization from a first person is permitted. The rules also determine when authorization by a second person is required to authorize the electronic commerce transaction. When collaborative authorization is required, a collaborative communications address is retrieved from the commerce profile and communicated.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 8-12 are schematics further illustrating various communications devices for obtaining collaborative authorization, according to the exemplary embodiments.

DETAILED DESCRIPTION

Figure 1:
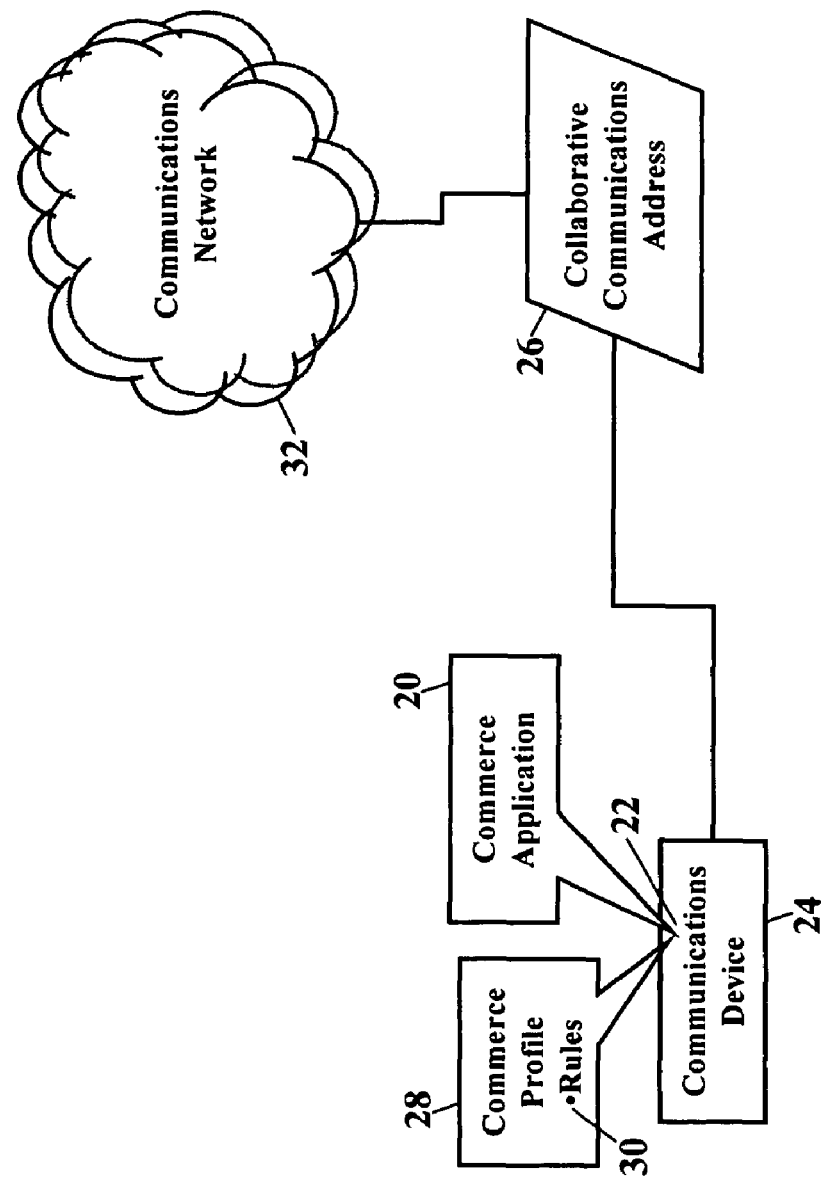
FIG. 1 is a schematic illustrating a commerce application, according to the exemplary embodiments.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, methods, systems, and products obtain collaborative authorization in an electronic transaction. According to exemplary embodiments, the term "collaborative authorization" means that two or more parties must authorize or approve an electronic transaction, such as a credit card transaction. When a purchaser presents a credit card for payment, usually the credit issuing retailer or institution must authorize the transaction. These exemplary embodiments, however, allow an additional party to also authorize the same transaction. If the additional party fails to authorize the transaction, then the transaction is declined, regardless of whether other parties approved the transaction. In other words, all parties who wish to authorize the transaction are contacted for authorization. A denial by any authorizing party causes the transaction to be declined.

A familiar example may help explain the concept. Suppose a teenage son or daughter uses a parent's credit card to purchase clothing at a shopping mall. The son or daughter has the parent's permission to make purchases, yet the parent also wants to authorize some, or all, of those purchases at the time of each sale. When the teenage shopper presents the parent's credit card as payment, these concepts would contact the parent for remote authorization. The parent then has an opportunity to approve, or deny, the charges. So, regardless of whether a financial institution approves the transaction, these concepts permit the parent to ultimately authorize the transaction. The parent is thus the "collaborating party," and the parent may override any approval of the financial institution or retailer. The parent must collaborate with the financial institution and approve the transaction. Should the financial institution decline the transaction, however, no collaborative authorization is necessary.

The exemplary embodiments determine when collaborative authorization is required. Collaborative authorization allows more than one party to authorize the same transaction. If any collaborating party fails to authorize the transaction, then the transaction is declined, regardless of whether other parties approve the transaction. According to exemplary embodiments, a party to the electronic transaction has a profile. The profile stores configurable rules that determine when collaborative authorization is required for an electronic transaction. As the following paragraphs will explain, the rules describe what transactions require approval from a collaborating party or parties. The collaborating party, for example, may want to authorize any electronic transaction that exceeds a maximum amount (e.g., any transaction greater than $100 requires collaborative authorization). The collaborating party, likewise, may want to authorize any transaction involving certain categories of products or services (e.g., alcohol, tobacco, and/or pharmaceutical products). The collaborating party may also want to authorize any transaction involving a predetermined retailer or website (pornographic websites and/or adult establishments). However the rules are defined, the exemplary embodiments determine when the collaborating party should be informed of an electronic transaction. When collaborative authorization is required, the exemplary embodiments then provide one or more communications addresses for the collaborating party. The collaborating party may then be contacted for authorization.

FIG. 1 is a schematic illustrating some of the exemplary embodiments. A commerce application 20 is stored in memory 22 of a communications device 24. Although the communications device 24 is generically shown, the communications device 24, as will be later explained, may be a computer, a personal digital assistant (PDA), a cordless/cellular/IP phone, or any other wireline/wireless communications device. The commerce application 20 is a computer program that determines when collaborative authorization is required in an electronic commerce transaction. That is, the commerce application 20 determines when a second person's authorization is required before goods and/or services may be purchased by a first person. A parent, for example, may want to collaboratively authorize some, or all, of a child's purchases. A son or daughter may wish to collaboratively authorize purchases by an elderly parent. As the following paragraphs will explain, when the commerce application 20 determines that collaborative authorization is required, a collaborative communications address 26 is retrieved. The collaborative communications address 26 may be an email address, a wireline/wireless phone number, a pager address, an instant message address, or any other communications address for the collaborative, authorizing party. A communication (not shown) may then be sent to that collaborative communications address 26. If the collaborative, authorizing party approves the electronic commerce transaction, then the transaction is processed. If, however, the collaborative, authorizing party fails to approve the electronic commerce transaction, then the transaction is declined.

An example may help explain the concept. Most readers are assumed accustomed to a credit card transaction. When a person purchases goods or services using a credit card, that credit card is processed for authorization. If a financial institution or other entity approves the transaction, then the transaction is processed. The commerce application 20, however, may require additional authorizations from additional parties. Each additional party may be any entity, such as a parent, guardian, trustee, or other institution, that is also responsible for payment. Before the credit card transaction can be approved, each additional party (e.g., the "collaborating party") must provide collaborative authorization. That is, the collaborating party must cooperate and also authorize the transaction. If the collaborating party refuses to authorize, then the transaction is denied.

Another example involves a teenage shopper. Suppose a teenage son or daughter uses a parent's credit card to purchase clothing at a shopping mall. The son or daughter has the parent's permission to make purchases, yet the parent also wants to authorize some, or all, of those purchases at the time of each sale. When the teenage shopper presents the parent's credit card as payment, both the teenage shopper (e.g., the purchaser or shopper) and the credit issuing financial institution must approve the transaction. According to an exemplary embodiment, however, a third party (such as the parent) is also contacted for remote authorization. The parent then has an opportunity to approve, or deny, the charges. So, regardless of whether the financial institution approves the transaction, the parent is permitted to ultimately authorize the transaction. The collaborating party thus may override any approval of a financial institution. Should the financial institution decline the transaction, then no collaborative authorization is necessary.

The commerce application 20, as earlier mentioned, determines when collaborative authorization is required. The commerce application 20 accesses a commerce profile 28. The commerce profile 28 is configured with one or more rules 30 that determine the circumstances in which collaborative authorization is required. FIG. 1 shows the commerce profile 28 locally stored in the memory 22 of the communications device 24. The commerce profile 28, however, may be remotely stored and accessed via a communications network 32. Whether the commerce profile 28 is locally or remotely accessed, the commerce profile 28 stores the rules 30 for specifying when a second person's authorization is required to process an electronic transaction.

Figure 2:
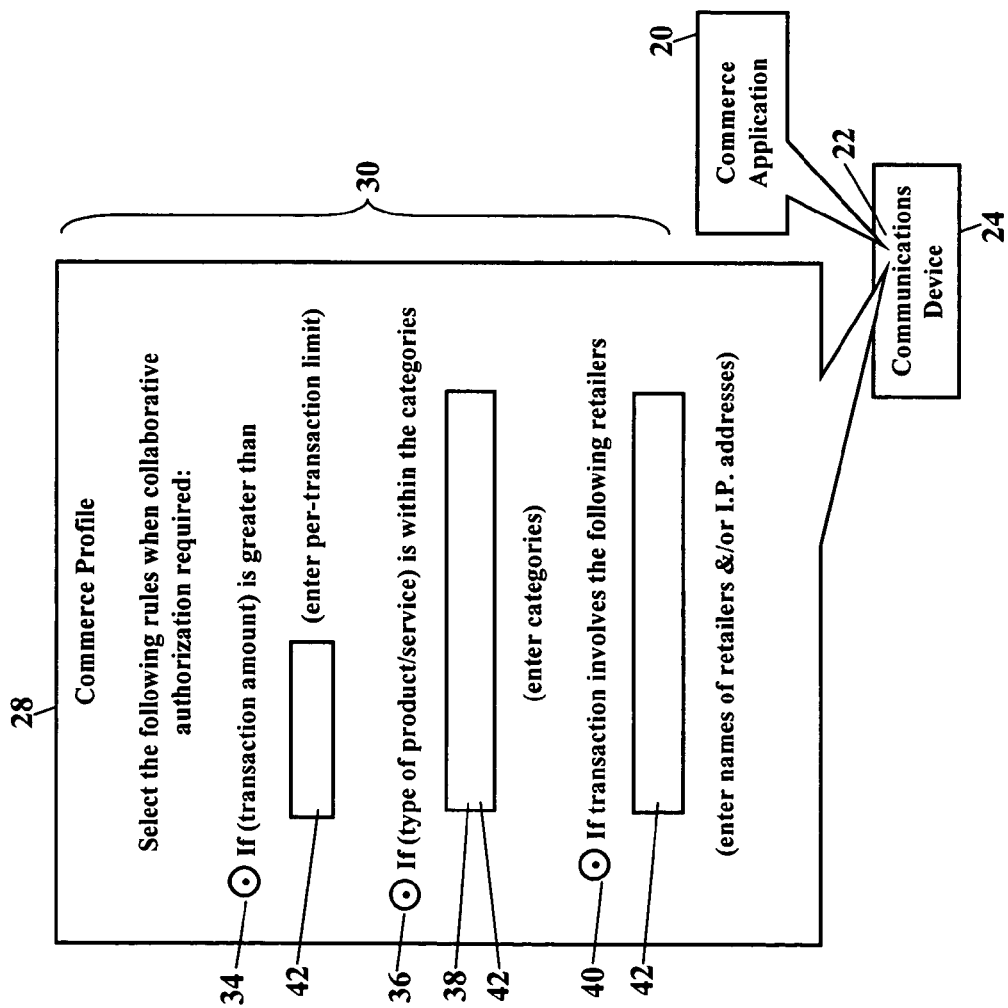
FIG. 2 is a schematic illustrating rules for determining when collaborative authorization is required, according to the exemplary embodiments.

FIG. 2 is a schematic illustrating some of the rules 30, according to the exemplary embodiments. The rules 30 determine when authorization from a single person is permitted, and the rules 30 determine when collaborative authorization by a second person is required to authorize an electronic transaction. A first rule, for example, may specify that when a single transaction amount exceeds a per-transaction limit 34, then collaborative authorization is required. Another rule may additionally or alternatively specify that when a type of product 36 (or service) is purchased, then collaborative authorization is required. The type of product (or service) is most simply described according to a category 38. When any transaction detail indicates the type of product or service being purchased matches the category 38, then the commerce profile 28 would require collaborative authorization. Yet another rule may specify that when the electronic transaction involves a predetermined retailer 40, then collaborative authorization is required. Data fields 42 would accept textual or character data identifying the per-transaction limit 34, the categories 38, and the one or more retailers 40. The name of the predetermined retailer 40 may be any information identifying any website or other address. The predetermined retailer 40, for example, may accept an I.P. address of one or more online retailers/websites for which collaborative authorization is required.

The commerce profile 28 may store other rules and/or options. The commerce profile 28, for example, may also describe when collaborative authorization is not required. That is, the commerce profile 28 may describe situations in which only authorization by a single purchasing person is required. If collaborative authorization is required when a single transaction amount exceeds the per-transaction limit 34, then collaborative authorization is implicitly not required for transaction amounts less than the limit. Similarly, if collaborative authorization is required for a particular type of product, then collaborative authorization is implicitly not required for products/services not matching the category 38. When the commerce application 20 monitors for any transaction involving the predetermined retailer 40, then collaborative authorization is implicitly not required for retailers/websites not matching entries in the data field 42.

The commerce profile 28 may store yet more rules and/or options. The rules 30, for example, may specify a daily purchase limit. When one purchasing party exceeds a daily purchase limit, then a co-signing party or second responsible purchaser may be required to collaboratively authorize any transaction(s) that exceed(s) the daily limit. The rules 30 may also specify a monthly purchase limit, in which collaborative authorization is required for purchases that exceed a monthly maximum dollar amount. The rules 30 may also monitor the number of transactions involving the same retailer/website. When the number of transactions exceed a predefined limit, within a defined time period, then collaborative authorization is required. The commerce profile 28 may even be configured to require collaborative authorization for all transactions.

Figure 3:
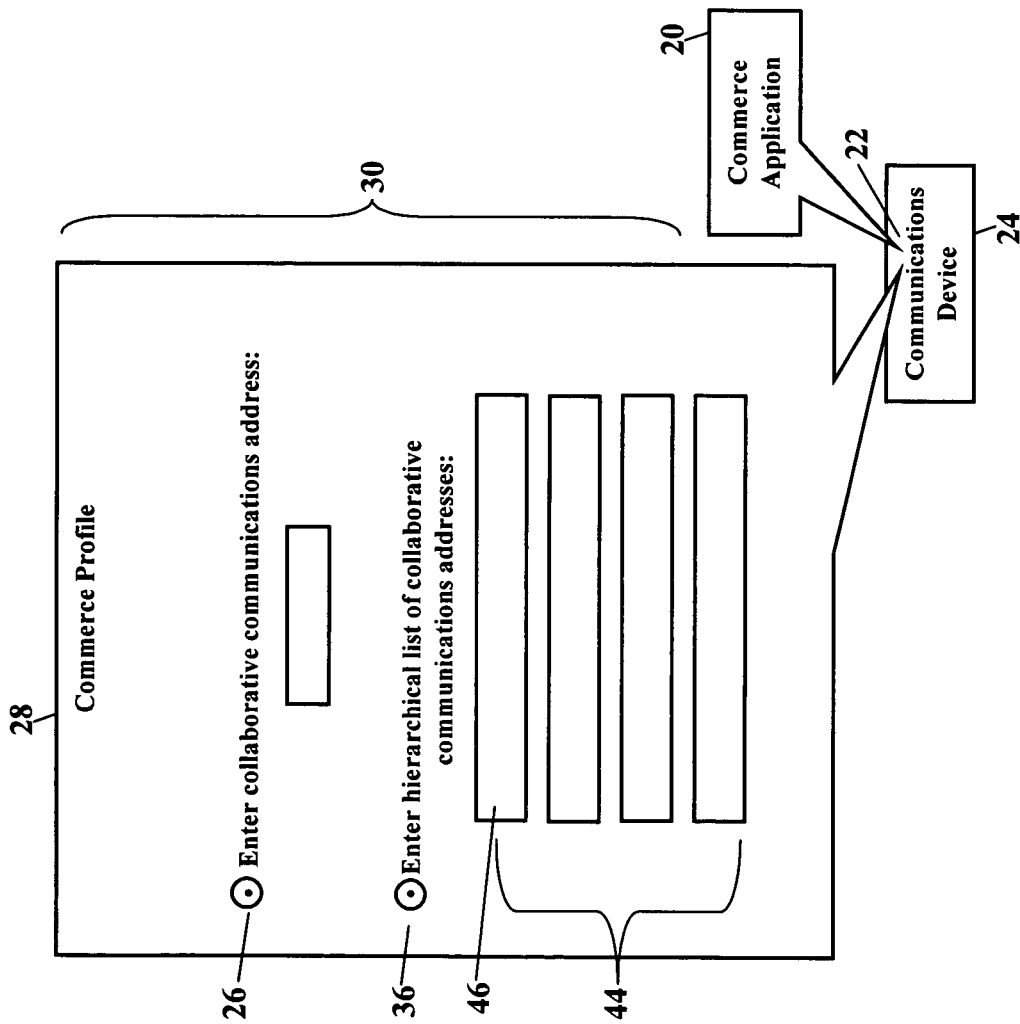
FIG. 3 is a schematic illustrating a collaborative communications address, according to the exemplary embodiments.

FIG. 3 is a schematic illustrating the collaborative communications address 26, according to the exemplary embodiments. The commerce profile 28, as above described, stores the rules 30 that define when collaborative authorization is required for an electronic commerce transaction. When collaborative authorization is required, the collaborative communications address 26 is retrieved from the commerce profile 28. The collaborative communications address 26 may be an email address, a wireline/wireless phone number, a pager address, an instant message address, or any other communications address for the collaborative, authorizing party. As FIG. 3 shows, the collaborative communications address 26 may be a single address in which the collaborative, authorizing party may be reached. When, however, the collaborative, authorizing party has multiple communications addresses/devices, the commerce profile 28 may consult a hierarchical list 44 of communications addresses. The commerce profile 28 may retrieve one communications address at a time, or the commerce profile 28 may retrieve and communicate the entire hierarchical list 44 of communications addresses. When collaborative authorization is unobtainable from the first address 46 in the list 44, then collaborative authorization is sequentially attempted using each address in the list 44 until authorization is obtained.

The commerce profile 28 may also include contact preferences for the collaborating party. The second, collaborating party may specify dates and times for multiple communications addresses. That is, the collaborating party may not want to receive communications during sleeping hours, dinner time, or other "do not disturb" times. The collaborating party may wish to block communications to a work phone, work email, or other work communications address. The collaborating party may also specify override options during vacations, holidays, or personal moments.

Figure 4:
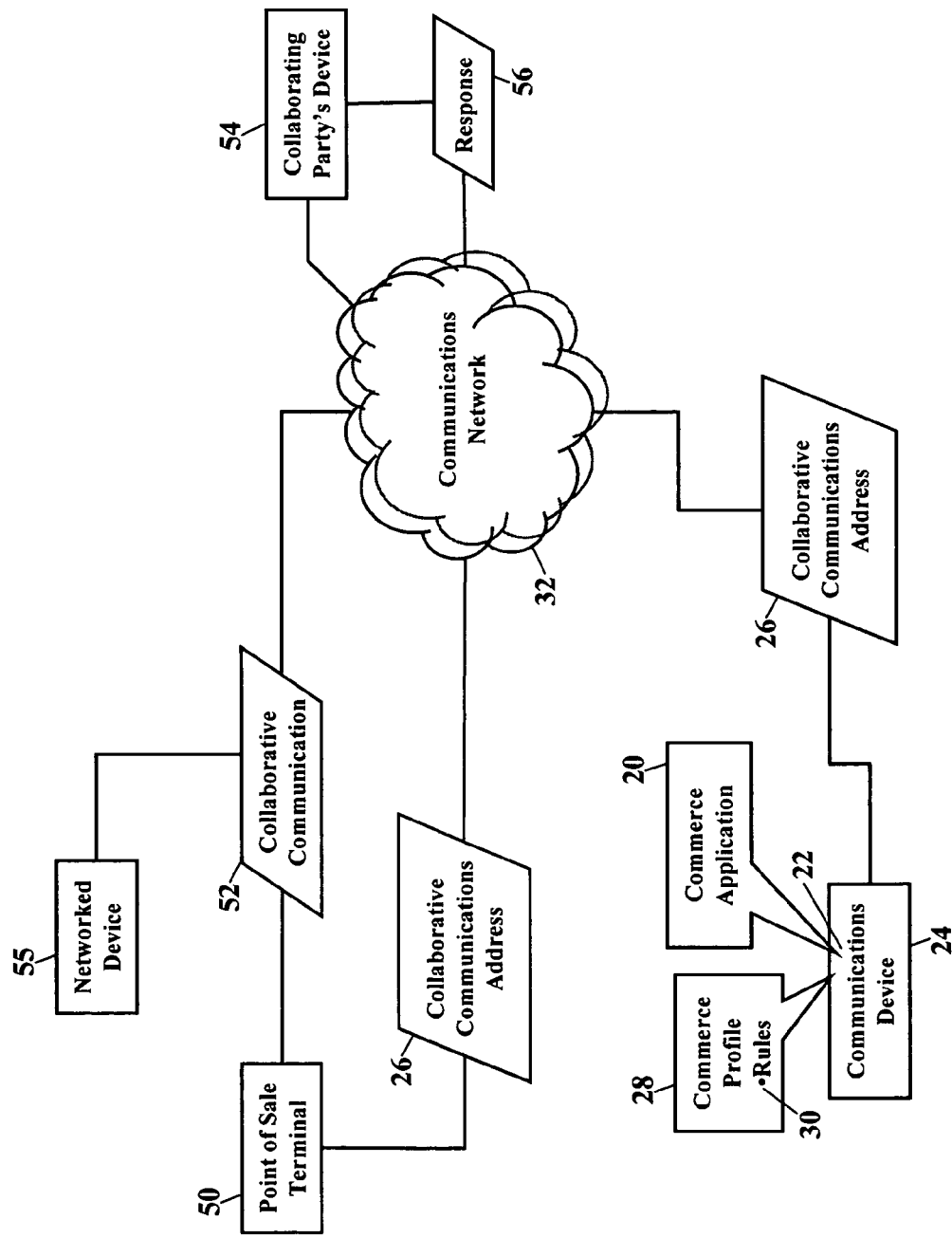
FIG. 4 illustrates an operating environment for the exemplary embodiments.

FIG. 4 is a schematic illustrating an alternative operating environment, according to more exemplary embodiments. Here the commerce application 20 communicates with a point of sale terminal 50. The commerce application 20 is again stored in the memory 22 of the communications device 24. The commerce application 20 participates in an electronic transaction with the point of sale terminal 50. The commerce application 20, again, determines when collaborative authorization is required for the electronic transaction (by accessing the commerce profile 28 and the rules 30, as above explained). When collaborative authorization is required, the collaborative communications address 26 is retrieved from the commerce profile 28. The commerce application 20 communicates the collaborative communications address 26 to the point of sale terminal 50 via the communications network 32. The point of sale terminal 50 would then arrange for a collaborative communication 52 to be sent to the second, collaborating party 54. The point of sale terminal 50 may itself send the collaborative communication 52, or the point of sale terminal 50 may request another networked device 55 to send the collaborative communication 52. Regardless, the collaborative communication 52 routes to the second, collaborating party 54. A response 56 then communicates from the collaborating party 54 via the communications network 32. If the second collaborating party provides authorization, then the transaction is processed. If, however, the collaborating party fails, for any reason, to approve the electronic transaction, then the transaction may be declined.

Figure 5:
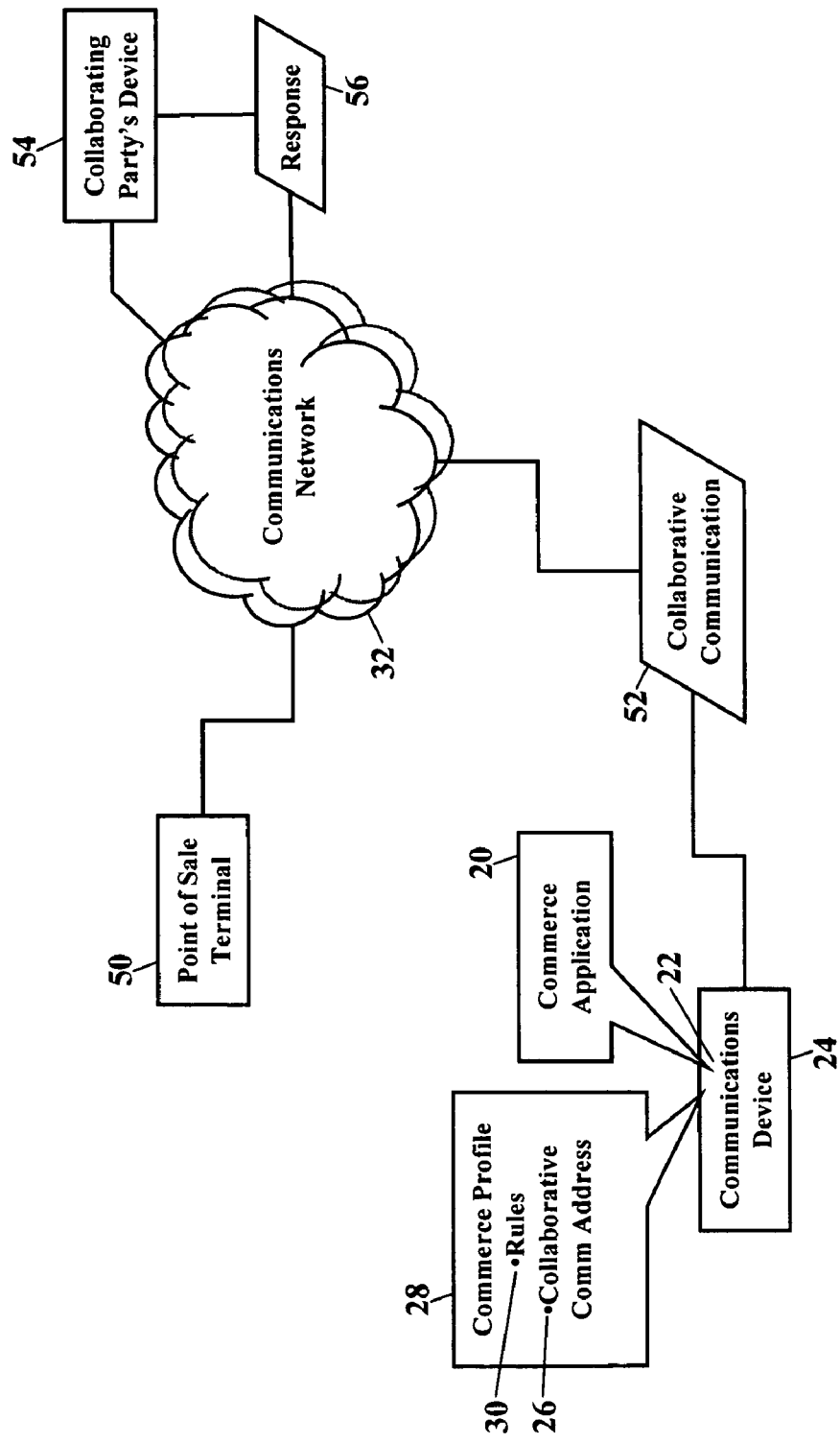
FIG. 5 is a schematic illustrating another alternative operating environment, according to yet more exemplary embodiments.

FIG. 5 is a schematic illustrating another alternative operating environment, according to yet more exemplary embodiments. Here the commerce application 20 communicates with the second collaborating party to obtain authorization for an electronic transaction. The commerce application 20 is stored in the memory 22 of the communications device 24. The commerce application 20 participates in an electronic transaction with the point of sale terminal 50. The commerce application 20 determines when collaborative authorization is required for the electronic transaction. When collaborative authorization is required, the collaborative communications address 26 is retrieved from the commerce profile 28. Here, however, the commerce application 20 forms and communicates the collaborative communication 52. That is, here the commerce application 20 initiates communication with the second, collaborating party 54. The commerce application 20 sends the collaborative communication 52 to the collaborative communications address 26. The commerce application 20 then awaits the response 56. The response 56 indicates an authorization, or a denial, from the collaborating party 54. If no response is received within a predetermined time, the commerce application 20 may be configured to send a second communication. If no response is received within the predetermined time, the commerce application 20 may alternatively or additionally be configured to assume denial. If the response 56 is received, and it indicates an authorization, the commerce application 20 approves and permits processing of the electronic transaction. If the response 56 indicates a denial, or if denial is assumed, the commerce application 20 denies the electronic transaction.

Figure 6:
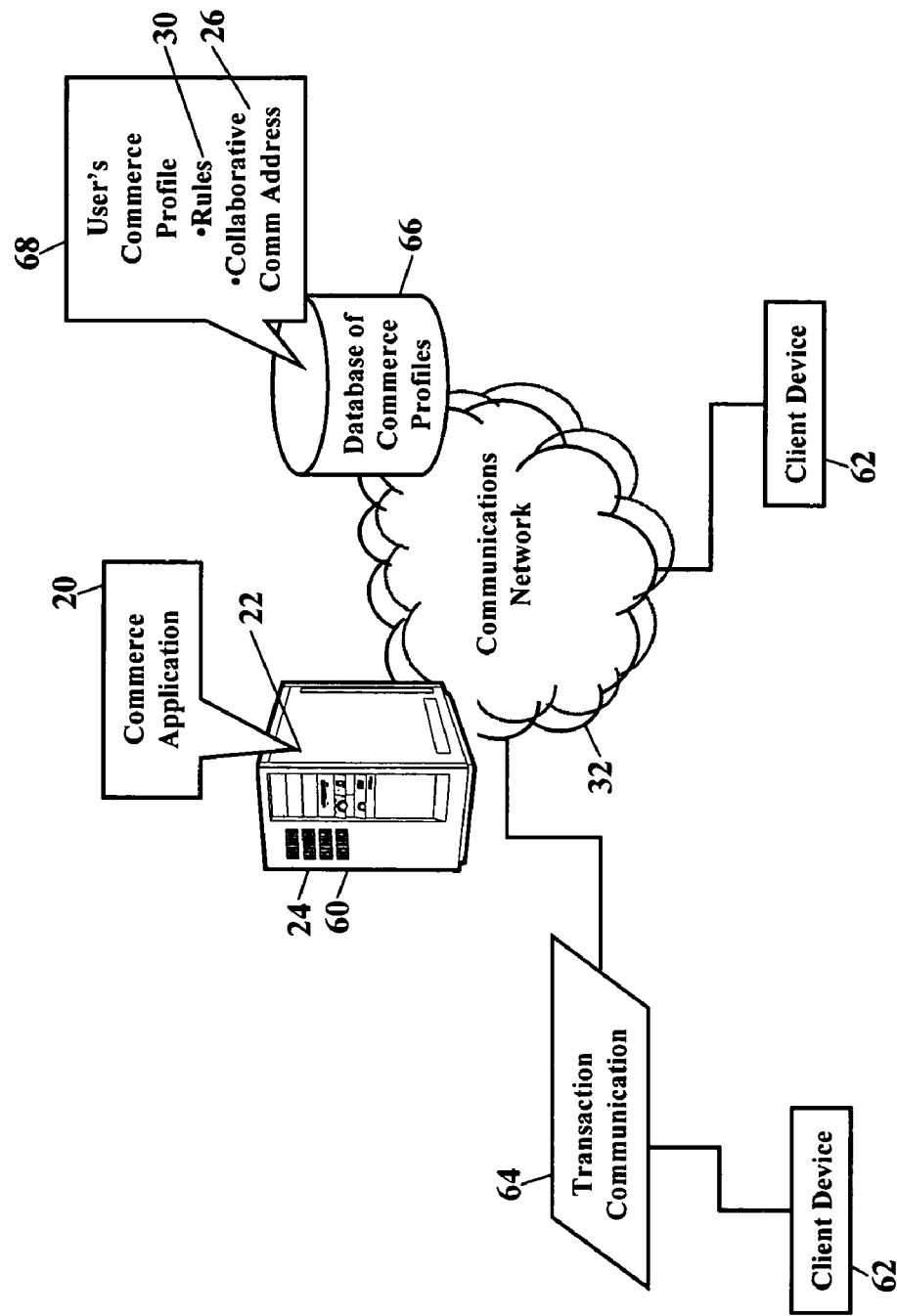
FIG. 6 is a schematic illustrating another possible operating environment, according to yet more exemplary embodiments.

FIG. 6 is a schematic illustrating another possible operating environment for the commerce application 20. Here the commerce application 20 provides collaborative authorization services in a networked client-server environment. The commerce application 20, as before, stores in the memory 22 of the communications device 24. Here, however, the communications device 24 is shown as a computer server 60. The commerce application 20 and the computer server 60 communicate with one or more client devices 62 via the communications network 32. Some portions of the commerce application 20, however, may also operate within memory of the client device 62. The client device 62 may be any computer or computing device that desires to know whether collaborative authorization is required for an electronic commerce transaction. The client device 62, for example, could be a point of sale terminal at a retailer. The client device 62 could also be any computer processing any part of an electronic transaction for a seller, a retailer, a website, and/or a financial institution. The commerce application 20, the computer server 60, and the client device 62 all communicate via the communications network 32. The communications network 32 may be a cable network operating in the radio-frequency domain and/or the Internet Protocol (IP) domain. The communications network 32, however, may also include a distributed computing network, such as the Internet (sometimes alternatively known as the "World Wide Web"), an intranet, a local-area network (LAN), and/or a wide-area network (WAN). The communications network 32 may include coaxial cables, copper wires, fiber optic lines, and/or hybrid-coaxial lines. The communications network 32 may even include wireless portions utilizing any portion of the electromagnetic spectrum and any signaling standard (such as the I.E.E.E. 802 family of standards, GSM/CDMA/TDMA or any cellular standard, and/or the ISM band).

The commerce application 20 determines when collaborative authorization is required for an electronic transaction. The commerce application 20 receives a transaction communication 64 from the client device 62. The transaction communication 64 is received via the communications network 32. The transaction communication 64 informs the commerce application 20 of an electronic transaction. The transaction communication 64 includes information that represents any transaction details that the commerce application 20 requires for collaborative authorization. The transaction communication 64 may include information representing the purchaser, the seller, an account number, and a transaction amount. The transaction communication 64, for example, may include a credit card account number, the name of the retailer or website selling the good or service, the name of the purchaser, the date and time of the transaction, the type of good or service purchased, and the amount charged to the credit card account number.

As FIG. 6 illustrates, the commerce application 20 consults a database 66 of commerce profiles. The database 66 of commerce profiles stores profiles for each account requiring collaborative authorization. Because the transaction communication 64 includes information that describes the details of the electronic transaction, the commerce application 20 queries to determine whether collaborative authorization is required. The commerce application 20 queries the database 66 of commerce profiles. The query includes any transaction details that help retrieve a particular commerce profile stored in the database 66 of commerce profiles. The database 66 of commerce profiles return communicates a user's commerce profile 68 to the commerce application 20. The commerce application 20 then determines whether collaborative authorization is required for the electronic transaction (by processing the rules 30, as previously explained). When collaborative authorization is required, the collaborative communications address 26 is retrieved from the user's commerce profile 68.

The commerce application 20 may be configured to simply communicate the collaborative communications address 26. That is, when collaborative authorization is required, the commerce application 20 then communicates the collaborative communications address 26 to a destination address. Here the commerce application 20 would not be configured to attempt communication with the collaborating party. The commerce application 20, instead, simply provides the collaborative communications address 26 to another device (such as the client device 62 or any other computer). The commerce application 20 relies upon some other device to actually attempt communication with the collaborating party.

The commerce application 20, however, may obtain collaborative authorization. When the commerce application 20 determines that collaborative authorization is required, the commerce application 20 may communicate with the second, collaborating party. As FIG. 5 illustrated, the commerce application 20 forms and communicates the collaborative communication 52 to the collaborative communications address 26. The commerce application 20 then awaits authorization, or denial, from the collaborating party 54. When collaborative authorization is received, the commerce application 20 approves and permits processing of the electronic transaction. If a denial is received, or assumed, the commerce application 20 denies the electronic transaction.

Figure 7:
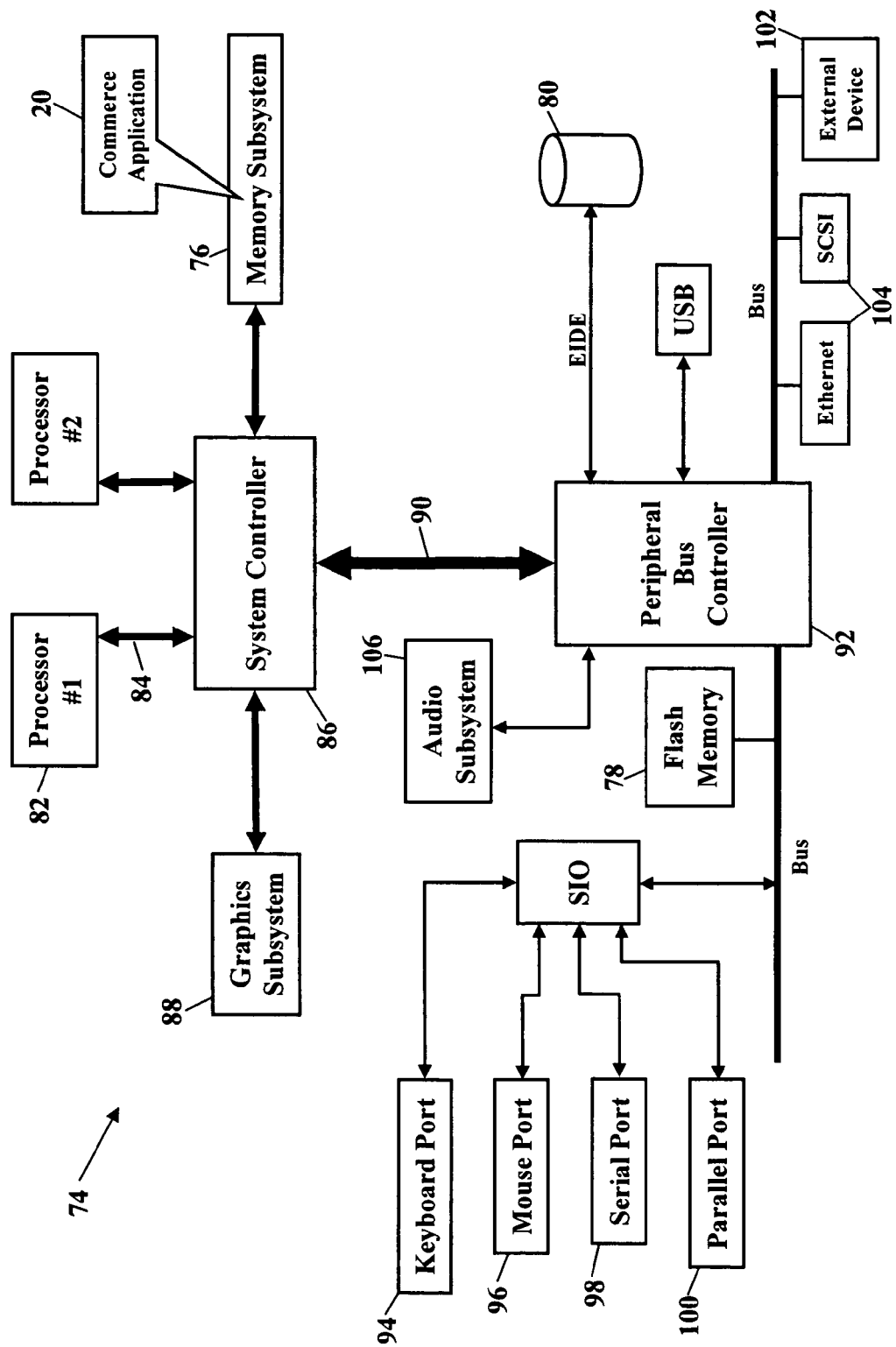
FIG. 7 depicts another possible operating environment for the exemplary embodiments.

FIG. 7 depicts another possible operating environment for the exemplary embodiments. FIG. 7 is a block diagram showing the commerce application 20 residing in a computer system 74 (such as the communications device 24 shown in FIG. 1 or the computer server 60 shown in FIG. 6). FIG. 7, however, may also represent a block diagram of any computer, communications device, or processor-controlled device. The commerce application 20 operates within a system memory device. The commerce application 20, for example, is shown residing in a memory subsystem 76. The commerce application 20, however, could also reside in flash memory 78 or peripheral storage device 80. The computer system 74 also has one or more central processors 82 executing an operating system. The operating system, as is well known, has a set of instructions that control the internal functions of the computer system 74. A system bus 84 communicates signals, such as data signals, control signals, and address signals, between the central processor 82 and a system controller 86 (typically called a "Northbridge"). The system controller 86 provides a bridging function between the one or more central processors 82, a graphics subsystem 88, the memory subsystem 76, and a PCI (Peripheral Controller Interface) bus 90. The PCI bus 90 is controlled by a Peripheral Bus Controller 92. The Peripheral Bus Controller 92 (typically called a "Southbridge") is an integrated circuit that serves as an input/output hub for various peripheral ports. These peripheral ports could include, for example, a keyboard port 94, a mouse port 96, a serial port 98, and/or a parallel port 100 for a video display unit, one or more external device ports 102, and networking ports 104 (such as USB, SCSI, or Ethernet). The Peripheral Bus Controller 102 could also include an audio subsystem 106. Those of ordinary skill in the art understand that the program, processes, methods, and systems described herein are not limited to any particular computer system or computer hardware.

One example of the central processor 82 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, the WINDOWS® (WINDOWS® is a registered trademark of Microsoft Corporation, One Microsoft Way, Redmond Wash. 98052-6399, 425.882.8080, www.Microsoft.com) operating system may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 76, flash memory 78, or peripheral storage device 80) may also contain an application program. The application program cooperates with the operating system and with a video display unit (via the serial port 98 and/or the parallel port 100) to provide a Graphical User Interface (GUI). The Graphical User Interface typically includes a combination of signals communicated along the keyboard port 94 and the mouse port 96. The Graphical User Interface provides a convenient visual and/or audible interface with a user of the computer system 74.

Figure 8:
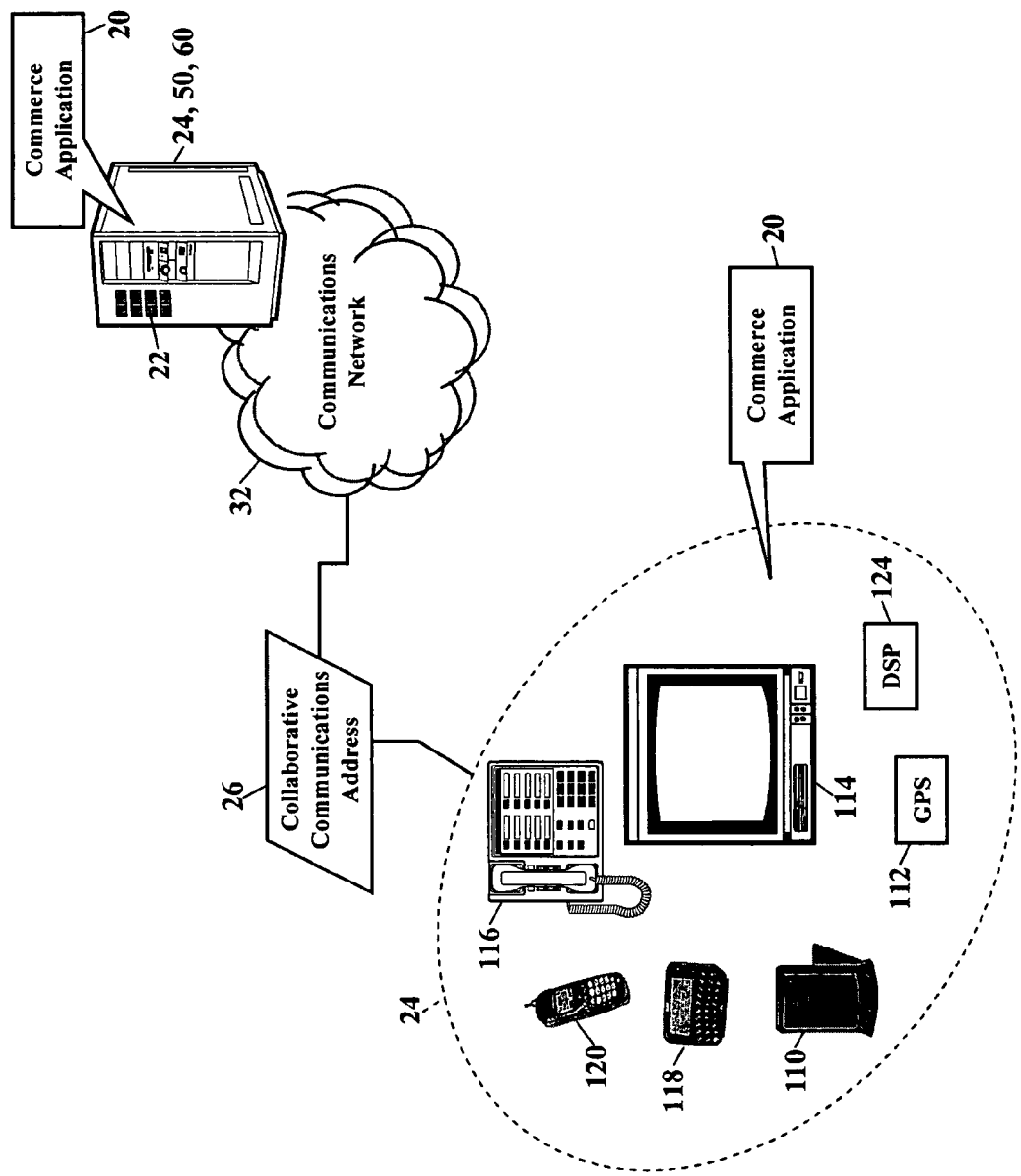

FIG. 8 is a schematic illustrating still more exemplary embodiments. FIG. 8 illustrates that the commerce application 20 may alternatively or additionally operate within various other communications devices 24. FIG. 8, for example, illustrates that the commerce application 20 may entirely or partially operate within a personal digital assistant (PDA) 110, a Global Positioning System (GPS) device 112, an interactive television 114, an Internet Protocol (IP) phone 116, a pager 118, a cellular/satellite phone 120, or any computer system and/or communications device utilizing a digital signal processor (DSP) 124. The communications device 24 may also include watches, radios, vehicle electronics, clocks, printers, gateways, and other apparatuses and systems.

Figure 9:
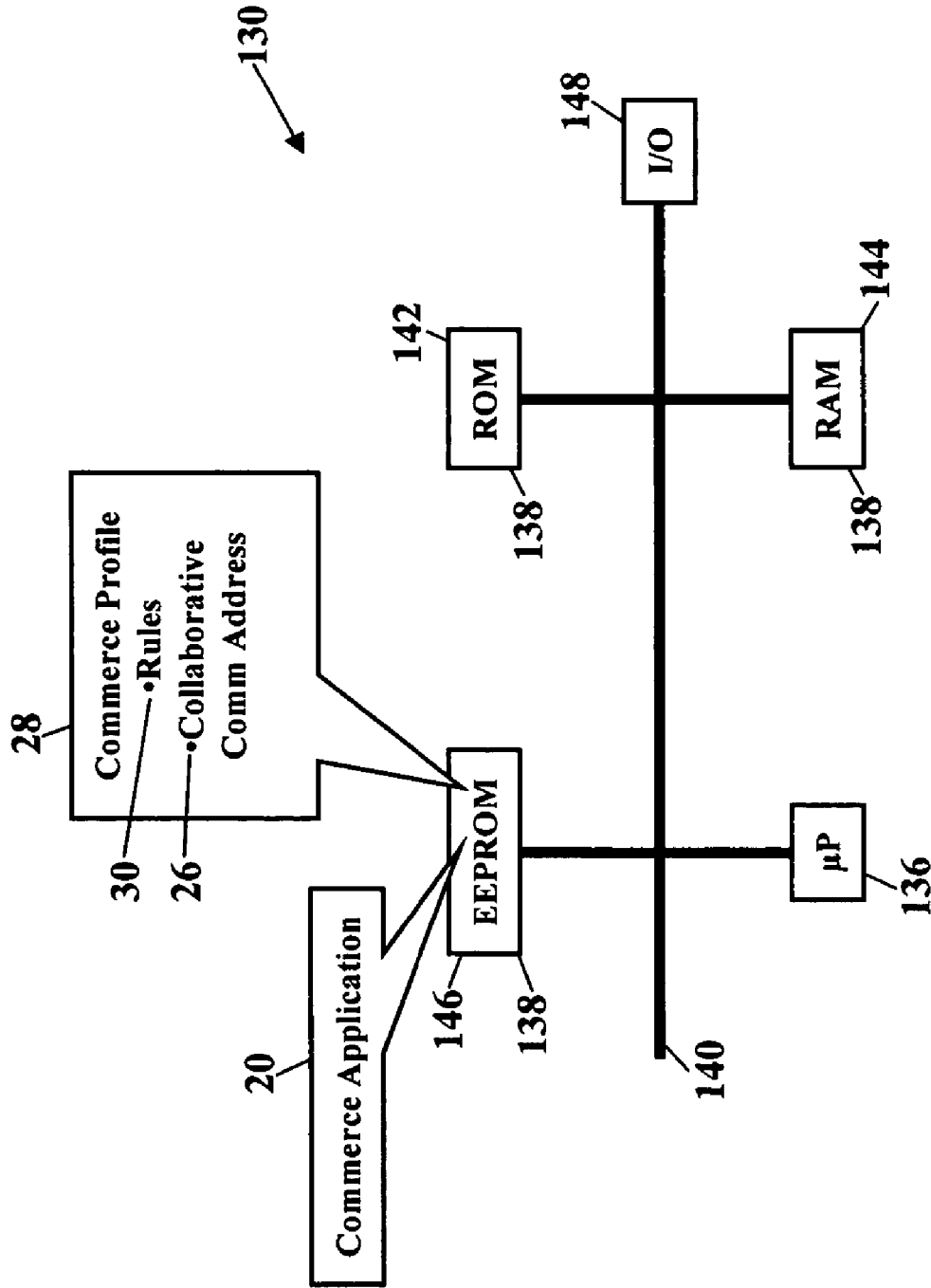

FIGS. 9-11 are schematics further illustrating various other communications devices for determining collaborative authorization, according to the exemplary embodiments. FIG. 9 is a block diagram of a Subscriber Identity Module 130, while FIGS. 10 and 11 illustrate, respectively, the Subscriber Identity Module 130 embodied in a plug 132 and the Subscriber Identity Module 130 embodied in a card 134. As those of ordinary skill in the art recognize, the Subscriber Identity Module 130 may be used in conjunction with many communications devices (such as the communications devices 24 shown in FIG. 8). The Subscriber Identity Module 130 stores user information (such as the user's International Mobile Subscriber Identity, the user's $K_i$ number, and other user information), perhaps the commerce profile 28, and any portion of the commerce application 20. As those of ordinary skill in the art also recognize, the plug 132 and the card 134 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 9 is a block diagram of the Subscriber Identity Module 130, whether embodied as the plug 132 of FIG. 10 or as the card 134 of FIG. 11. Here the Subscriber Identity Module 130 comprises a microprocessor 136 (μP) communicating with memory modules 138 via a data bus 140. The memory modules may include Read Only Memory (ROM) 142, Random Access Memory (RAM) and or flash memory 144, and Electrically Erasable-Programmable Read Only Memory (EEPROM) 146. The Subscriber Identity Module 130 stores some or all of the commerce application 20 in one or more of the memory modules 138. FIG. 9 shows the commerce application 20 residing in the Erasable-Programmable Read Only Memory 146, yet the commerce application 20 could alternatively or additionally reside in the Read Only Memory 142 and/or the Random Access/Flash Memory 144. An Input/Output module 148 handles communication between the Subscriber Identity Module 130 and the communications device. As those skilled in the art will appreciate, there are many suitable ways for implementing the operation and physical/memory structure of the a Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 12:
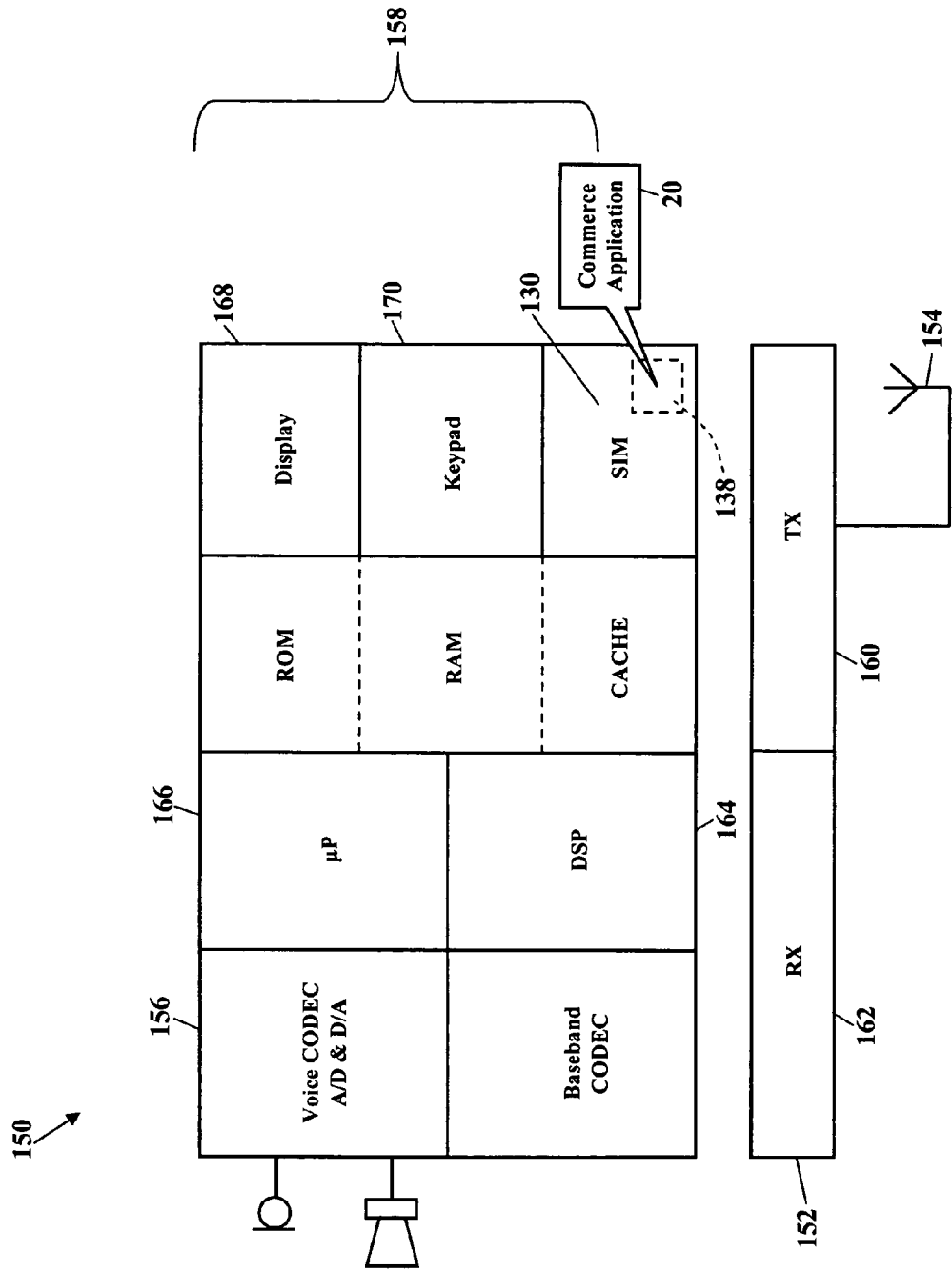

FIG. 12 is a schematic further illustrating various communications devices for collaborative authorization, according to the exemplary embodiments. FIG. 12 is a block diagram of another communications device 150 utilizing any portion of the commerce application 20. Here the communications device comprises a radio transceiver unit 152, an antenna 154, a digital baseband chipset 156, and a man/machine interface (MMI) 158. The transceiver unit 152 includes transmitter circuitry 160 and receiver circuitry 162 for receiving and transmitting radio-frequency (RF) signals. The transceiver unit 152 couples to the antenna 154 for converting electrical current to and from electromagnetic waves. The digital baseband chipset 156 contains a digital signal processor (DSP) 164 and performs signal processing functions for audio (voice) signals and RF signals. As FIG. 12 shows, the digital baseband chipset 156 may also include an on-board microprocessor 166 that interacts with the man/machine interface (MMI) 158. The man/machine interface (MMI) 158 may comprise a display device 168, a keypad 170, and the Subscriber Identity Module 130. The on-board microprocessor 166 performs GSM protocol functions and control functions for the radio circuitry 160 and 162, for the display device 168, and for the keypad 170. The on-board microprocessor 166 may also interface with the Subscriber Identity Module 130 and with the commerce application 20 residing in the memory module 138 of the Subscriber Identity Module 130. Those skilled in the art will appreciate that there may be many suitable architectural configurations for the elements of the communications device 150. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The commerce application 20 may be utilized regardless of signaling standard. As those of ordinary skill in the art recognize, FIGS. 9-12 illustrate a Global System for Mobile (GSM) communications device. That is, the communications device utilizes the Global System for Mobile (GSM) communications signaling standard. Those of ordinary skill in the art, however, also recognize the commerce application 20 is equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 13:
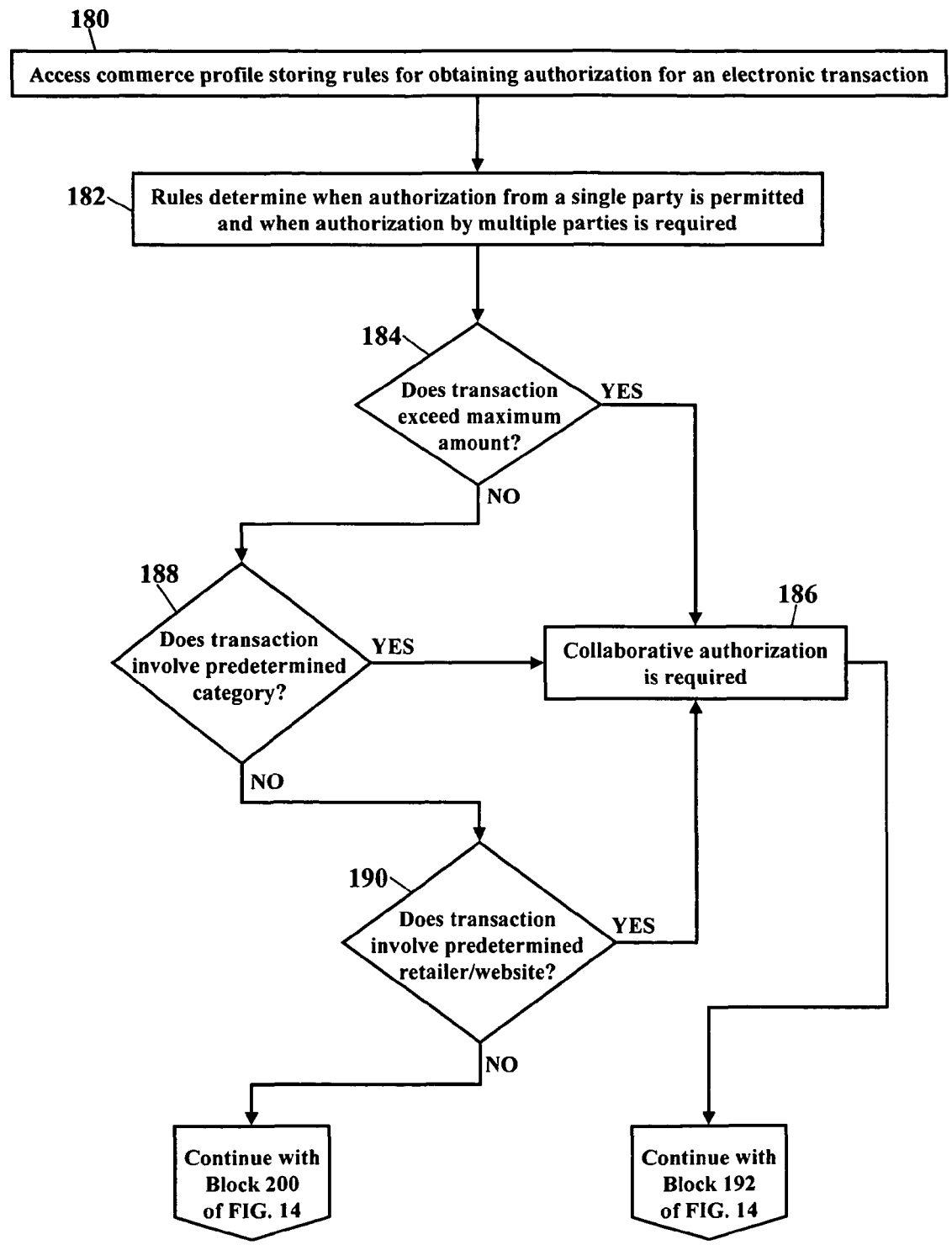
FIGS. 13 and 14 are flowcharts illustrating a method of obtaining collaborative authorization, according to an exemplary embodiment.

FIG. 13 is a flowchart illustrating a method for collaborative authorization in an electronic transaction. A commerce profile is accessed (Block 180). The commerce profile stores rules for obtaining authorization for the electronic transaction. The rules determine when authorization from a single party is permitted, and the rules determine when authorization by multiple, collaborating parties is required to authorize the electronic transaction (Block 182). A first party, for example, may be a banking institution, a retailer, a website, or other credit provider. A second, collaborating party may be any additional party that desires to authorize the same electronic transaction. The second, collaborating party, for example, could be a primary credit account holder, a parent, an employer, or another banking institution, a retailer, a website, a bankruptcy court or other governmental agency or court, or other credit provider. The commerce profile, for example, may store a rule that specifies when a transaction amount is greater than a maximum amount (Block 184), then collaborative authorization from the second party is required to authorize the electronic transaction (Block 186). Another rule may specify when a type of product is purchased (Block 188), then collaborative authorization from the second party is required to authorize the electronic transaction (Block 186). Another rule may specify that when the electronic transaction involves a predetermined retailer (Block 190), then collaborative authorization from the second party is required to authorize the electronic transaction (Block 186).

Figure 14:
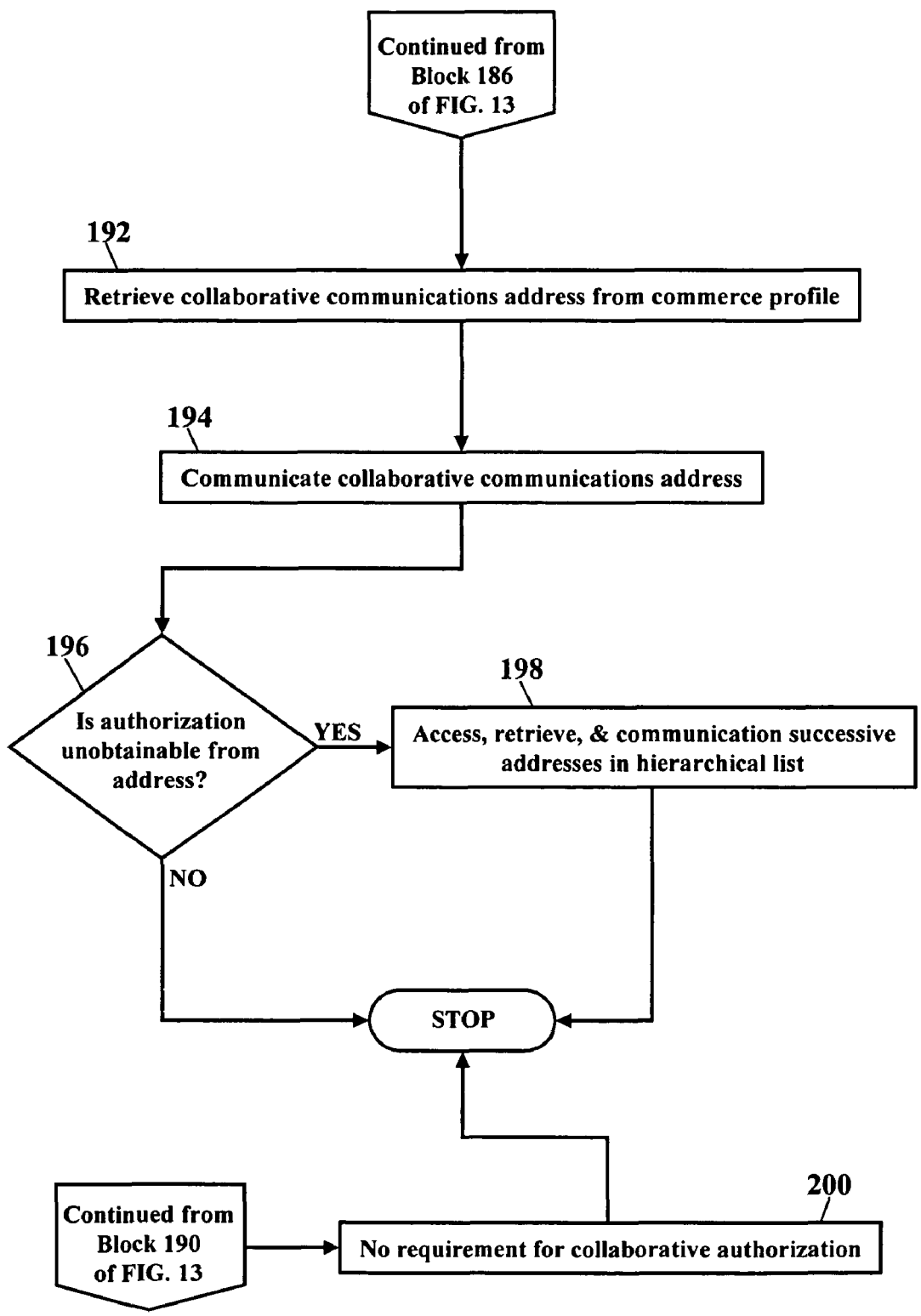

The flowchart continues with FIG. 14. Because collaborative authorization is required (Block 186 of FIG. 13), a collaborative communications address is retrieved from the commerce profile (Block 192) and communicated (Block 194). When authorization is unobtainable from the collaborative communications address (Block 196), then a hierarchical list of other communications addresses is accessed (Block 198). Each successive communications address in the list is retrieved and communicated. When collaborative authorization is not required (Block 190 of FIG. 13), then the method permits authorization by the first party (Block 200).

The commerce application (shown as reference numeral 20 in FIGS. 1-12) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the calendaring application to be easily disseminated. A computer program product comprises the commerce application stored on the computer-readable medium. The commerce application comprises computer-readable instructions/code for obtaining collaborative authorization for an electronic transaction. A commerce profile is accessed, and the commerce profile stores rules for obtaining authorization for an electronic transaction. The rules determine when collaborative authorization from a first party is permitted, and the rules determine when authorization by a second party is required to authorize the electronic transaction. When collaborative authorization is required, a collaborative communications address is retrieved from the commerce profile and communicated.

The commerce application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A device for collaborative authorization in an electronic transaction, the device comprising:
    a commerce profile stored in memory, the commerce profile comprising business rules that require a collaborative authorization for the electronic transaction between a purchaser, a financial institution, and a third party; and
    a processor communicating with the memory and participating in the electronic transaction, the rules causing the processor to:
    determine whether an amount of the electronic transaction exceeds a maximum amount;
    contractually require collaborative authorization from a third party when the amount of electronic transaction exceeds the maximum amount;
    determine whether the electronic transaction relates to a predefined category of product or service when the amount of the electronic transaction is less than or equal to the maximum amount;
    contractually require collaborative authorization from the third party when the electronic transaction involves the predefined category of product or service and when the amount of the electronic transaction is less than or equal to the maximum amount;
    determine whether the electronic transaction involves a predetermined Internet Protocol address and when the electronic transaction is unrelated to the predefined category of product or service and when the amount of the electronic transaction is less than or equal to the maximum amount;
    contractually require collaborative authorization from the third party when the electronic transaction is related to the predetermined Internet Protocol address and when the electronic transaction is unrelated to the predefined category of product or service and when the amount of the electronic transaction is less than or equal to the maximum amount; and
    decline collaborative authorization when the electronic transaction is unrelated to the predetermined Internet Protocol address and when the electronic transaction is unrelated to the predefined category of product or service and when the amount of the electronic transaction is less than or equal to the maximum amount.

2. A device according to claim 1, wherein the rules further cause the processor to retrieve a collaborative communications address from the commerce profile when collaborative authorization is required from the third party.

3. A device according to claim 2, wherein the rules further cause the processor to communicate a request for collaborative authorization to the collaborative communications address.

4. A device according to claim 2, wherein the rules further cause the processor to receive a denial from the collaborative communications address.

5. A device according to claim 1, wherein when collaborative authorization is not required, the processor permits authorization by the purchaser.

6. A device according to claim 1, wherein the rules cause the processor to receive a denial.

7. A device according to claim 1, wherein the rules cause the processor to access a hierarchical list of addresses and sequentially attempt to obtain collaborative authorization from each address.

8. A method for collaborative authorization in an electronic transaction, the method comprising:
    accessing a commerce profile stored in memory, the commerce profile comprising contractual rules for obtaining authorization for the electronic transaction;
    processing the electronic transaction between a purchaser and a financial institution;
    determining by a processor whether an amount of the electronic transaction exceeds a maximum amount;
    contractually requiring collaborative authorization from a third party when the amount of electronic transaction exceeds the maximum amount;
    determining by the processor whether the electronic transaction relates to a predefined category of product or service when the amount of the electronic transaction is less than or equal to the maximum amount;
    contractually requiring collaborative authorization from the third party when the electronic transaction involves the predefined category of product or service and when the amount of the electronic transaction is less than or equal to the maximum amount;
    determining whether the electronic transaction involves a predetermined Internet Protocol address and when the electronic transaction is unrelated to the predefined category of product or service and when the amount of the electronic transaction is less than or equal to the maximum amount;
    contractually requiring collaborative authorization from the third party when the electronic transaction is related to the predetermined Internet Protocol address and when the electronic transaction is unrelated to the predefined category of product or service and when the amount of the electronic transaction is less than or equal to the maximum amount; and
    declining collaborative authorization when the electronic transaction is unrelated to the predetermined Internet Protocol address and when the electronic transaction is unrelated to the predefined category of product or service and when the amount of the electronic transaction is less than or equal to the maximum amount;
    retrieving a collaborative communications address by the processor from the commerce profile when collaborative authorization is required from the third party;
    communicating a request for collaborative authorization from the processor to the collaborative communications address; and
    denying the electronic transaction by the processor when the third party refuses authorization, even though the purchaser and the financial institution have approved the electronic transaction.

9. A method according to claim 8, further comprising retrieving a date and a time associated with the collaborative communications address.

10. A method according to claim 8, further comprising retrieving a hierarchical list of addresses.

11. A method according to claim 10, further comprising receiving a denial from an address in the hierarchical list of addresses.

12. A method according to claim 10, further comprising receiving a denial from each address in the hierarchical list of addresses.

13. A method according to claim 8, further comprising receiving a denial from the collaborative communications address.

14. A method according to claim 8, further comprising communicating the collaborative communications address to a point of sale device.

15. A computer readable medium storing processor executable instructions that cause the processor to:
- accessing a commerce profile stored in memory, the commerce profile comprising contractual rules for obtaining authorization for the electronic transaction;
- processing the electronic transaction between a purchaser and a financial institution;
- determining whether an amount of the electronic transaction exceeds a maximum amount;
- contractually requiring collaborative authorization from a third party when the amount of electronic transaction exceeds the maximum amount;
- determining whether the electronic transaction relates to a predefined category of product or service when the amount of the electronic transaction is less than or equal to the maximum amount;
- contractually requiring collaborative authorization from the third party when the electronic transaction involves the predefined category of product or service and when the amount of the electronic transaction is less than or equal to the maximum amount;
- determining whether the electronic transaction involves a predetermined Internet Protocol address and when the electronic transaction is unrelated to the predefined category of product or service and when the amount of the electronic transaction is less than or equal to the maximum amount;
- contractually requiring collaborative authorization from the third party when the electronic transaction is related to the predetermined Internet Protocol address and when the electronic transaction is unrelated to the predefined category of product or service and when the amount of the electronic transaction is less than or equal to the maximum amount;
- declining collaborative authorization when the electronic transaction is unrelated to the predetermined Internet Protocol address and when the electronic transaction is unrelated to the predefined category of product or service and when the amount of the electronic transaction is less than or equal to the maximum amount;
- retrieving a collaborative communications address from the commerce profile when collaborative authorization is required from the third party;
- communicating a request for collaborative authorization to the collaborative communications address;
- determining whether the collaborative authorization is obtainable from the collaborative communications address;
- access a hierarchical list of addresses and sequentially attempt to obtain collaborative authorization from each address when the collaborative authorization is unobtainable from the collaborative communications address; and
- denying the electronic transaction when the third party refuses authorization, even though the purchaser and the financial institution have approved the electronic transaction.

16. The computer readable medium according to claim 15, further comprising instructions for retrieving a date and a time associated with the collaborative communications address.

17. The computer readable medium according to claim 15, further comprising instructions for retrieving a date and a time associated with each address in the hierarchical list of addresses.

18. The computer readable medium according to claim 15, further comprising instructions for receiving a denial from the collaborative communications address.

19. The computer readable medium according to claim 15, further comprising instructions for receiving a denial from an address in the hierarchical list of addresses.

20. The computer readable medium according to claim 15, further comprising instructions for receiving a denial from each address in the hierarchical list of addresses.

* * * * *